Feb. 6, 1940.  W. DOLPHIN  2,189,136

CUP AND THE LIKE

Filed Jan. 9, 1939

Inventor
William Dolphin
By Mann, Brown & Cox
Attys

Patented Feb. 6, 1940

2,189,136

UNITED STATES PATENT OFFICE 2,189,136

CUP AND THE LIKE

William Dolphin, Chicago, Ill.

Application January 9, 1939, Serial No. 249,976

4 Claims. (Cl. 65—13)

In dining cars, ships, and such places, much annoyance and loss are caused by spilling coffee, tea, and soup. Many unsuccessful efforts have been made to overcome the difficulty. The principal object of this invention is to provide vessels that will prevent spilling from ordinary causes but will not interfere with the normal use of such familiar vessels as coffee cups.

Generally speaking, this object is achieved by placing a smooth rib inside of the vessel near the top and including the inner wall of the rim inwardly over the rib.

A practically satisfactory embodiment is shown in the accompanying drawing, in which Fig. 1 is a plan view of a large coffee cup shown in full size;

Figure 1:
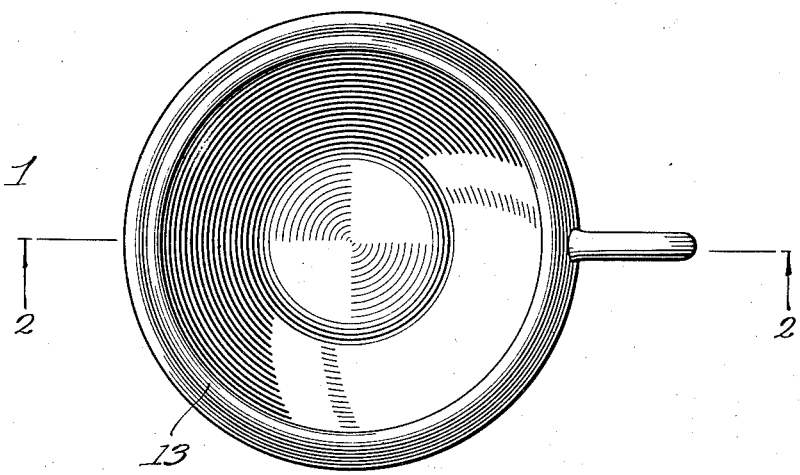
Figure 2:
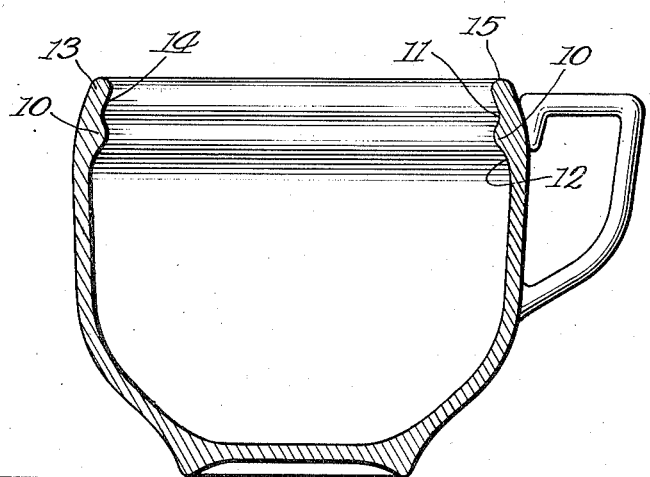
Fig. 2 is a vertical section taken on the line 2—2 of Fig. 1.

In Fig. 2, the rib will be seen clearly at 10 with fillets 11 and 12 above and below, and the rim 13 of the cup is turned inwardly to make its inner wall 14, extending from the fillet 11 to the curved edge 15, inclined inwardly and upwardly over the rib 10.

The rib and the fillets have smooth, easy curves to make it possible to readily clean the cup.

The shape of the cup below the fillet 12 is a matter of selection. In Fig. 2, there is shown a somewhat familiar shape of coffee cup; and in Fig. 3 there is indicated a vertical section of a cup thought by some to be more graceful and artistic. Many other forms may be selected.

The key to the situation appears to be in the smooth, curved rib 10 just below the inwardly inclined wall 14. The rib itself is sufficient to prevent spilling in a great many milder disturbances, but, when real shocks are encountered, the inclined wall 14 appears to be necessary to prevent spilling. Ordinarily, the two should be used to make the vessel universally serviceable.

Variations in both the rib and the rim can be made, but the rib should be kept well below the edge 15 to leave a distinct rim above it.

Figure 3:
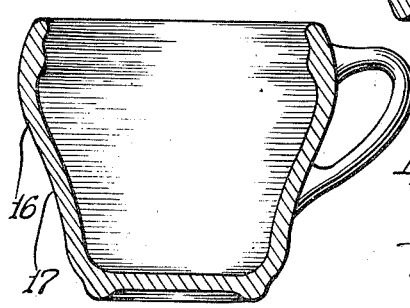
Fig. 3 is a section similar to Fig. 2 but showing a slightly modified form of the cup; but These specific illustrations and the corresponding descriptions are used for the purpose of disclosure only and are not intended to place unnecessary limitations on the claims.

The form of the construction shown in Fig. 3 differs from that just described in that the side walls of the cup 16 taper downwardly from a higher point as shown at 17 in said figure. Since the arrangement of the rib and the rim are substantially the same as that already described, it is not thought necessary to further illustrate or describe the same.

I claim:

1. A receptacle having an inwardly and upwardly inclined inside wall at the rim and a rounded rib on the inside adjacent to the rim, and below the same, said receptacle having its upper edge rounded.

2. A receptacle in the form of a cup for use in railway dining cars, and the like, having a contracted rim portion and a rounded rib encircling the receptacle on the inside under and adjacent to said rim portion.

3. A cup for use in railway diners and the like comprising a receptacle circular in horizontal section, an inwardly extending rib on its interior surface adjacent its upper edge, the upper and lower surfaces of the rib being curved in cross-section, the upper edge of said cup being rounded and the inner surface of said cup above the rib converging upwardly.

4. A cup for use in railway dining cars and the like, comprising a rounded open-top receptacle having an encircling rounded rib inside adjacent to, but below, the top with its upper and lower surfaces concave in vertical section, the rim of the cup being turned inwardly to make its inner wall incline inwardly and upwardly over the rib, the wall below the rib curving inwardly and downwardly toward the base.

WILLIAM DOLPHIN.